United States Patent [19]

Kaczynski

[11] Patent Number: 4,770,346

[45] Date of Patent: Sep. 13, 1988

[54] FUEL-INJECTION JET FOR INTERNAL COMBUSTION ENGINES

[75] Inventor: Bernhard Kaczynski, Waiblingen, Fed. Rep. of Germany

[73] Assignee: Robert Bosch GmbH, Stuttgart, Fed. Rep. of Germany

[21] Appl. No.: 4,474

[22] PCT Filed: Jan. 30, 1986

[86] PCT No.: PCT/DE86/00030

§ 371 Date: Nov. 24, 1986

§ 102(e) Date: Nov. 24, 1986

[87] PCT Pub. No.: WO86/06442

PCT Pub. Date: Nov. 6, 1986

[30] Foreign Application Priority Data

Apr. 27, 1985 [DE] Fed. Rep. of Germany ....... 3515264

[51] Int. Cl.[4] .......................................... G01M 15/00

[52] U.S. Cl. .................................... 239/73; 239/600; 73/119 A

[58] Field of Search .................................... 73/119 A; 239/533.2-533.12, 71, 73, 585, 600

[56] References Cited

U.S. PATENT DOCUMENTS 4,394,823 7/1983 Kopse et al. ..................... 73/119 A
4,482,093 11/1984 Hafner ......................... 239/533.3 X
4,502,326 3/1985 Kaczynski ........................ 73/119 A
4,546,739 10/1985 Nalsajma et al. ............ 239/533.4 X
4,573,349 3/1986 Slindee ............................ 73/119 A
4,638,659 1/1987 Schiessle et al. ................ 73/119 A

FOREIGN PATENT DOCUMENTS 0964457 10/1982 U.S.S.R. ......................... 73/119 A

*Primary Examiner*—Andres Kashnikow
*Assistant Examiner*—Kevin P. Weldon
*Attorney, Agent, or Firm*—Michael J. Striker

[57] ABSTRACT

Fuel-injection jet for internal combustion engines, with a needle movement sensor which is provided with an induction coil (30) with a coil core (36), an anchor bolt (38) being connected with the valve needle (18), a magnetic inference element (25) encompassing the induction coil (30) on the outside and two two feeding wires (40,42) which are fed out of the jet support (10) through a cable conduit (90). In accordance with the invention the cable conduit (90) consists of a central conduit segment (90) coaxially mounted with respect to the induction coil (90) and two subsequent bores (94,96) in a truncated angle (a) which discharge in the jacket circumference of jet support (10). The feeding wires (40,42) are fed in the area of the central conduit segment (92) through a cable feeding element (44). With this arrangement the needle movement sensor can be easily inserted as a premade structural unit into jet support (10). The air slot is advantageously formed between conical faces on the coil core (36) and the anchor bolt (38), so that the diameter of the needle movement sensor may be dimensioned smaller than with an embodiment having a cylindrical air slot.

12 Claims, 3 Drawing Sheets

FUEL-INJECTION JET FOR INTERNAL COMBUSTION ENGINES

BACKGROUND OF THE INVENTION

The invention is based on a fuel-injection jet. In a known injection jet of this type (DE-A No. 1 3227 989) the cable conduit which receives the feed wires of the induction coils is fed at a right angle with respect to the jet axis to the connecting ends of the induction coil. In this embodiment, the feeding wires are advantageously connected with the connecting ends of the induction coil after inserting the induction coil into the jet support. However, if the connection is performed before the inserting of the induction coil, special care must be taken during the insertion of the induction coil. In both cases, the cross section of the cable conduit must be dimensioned relatively large, and an increase is manufacturing effort must be assumed.

SUMMARY OF THE INVENTION

In contrast thereto, the arrangement in accordance with the invention is advantageous in that the feeding wires can be already connected before inserting the induction coil into the jet support, without making the inserting more difficult. The induction coil, together with the feeding wires and the cable feeding element, may form a premade structural group which can be placed as a unit into the jet support from the open front face of the jet support. Thereby, the feeding wires thread themselves automatically into the oblique disposed outer conduit section without any noticeable resistance. The free ends of the feeding wires advantageously emerge in the area of local recesses in the jacket face of the jet support and can be connected with further lines in a suitable manner. Thereby, the traction relief caused by the cooperation of the cable feeding element with the coil element provides that the already made connections of the feeding wires with the connecting ends of the induction coil are not damaged or again released. The outer conduit segments may have relatively tight bores, in contrast to the known arrangement, which can be easily sealed with simple and proven means.

In injection jets which are provided with a leaking oil discharge, the central conduit segment of the cable conduit may also advantageously form a segment for a leaking oil discharge conduit.

A safe operating traction relief for the connections of the connecting ends of the induction coil with the feeding wires can be obtained in a simple manner. The coil element contains two axial bores, through each one feeding wire is fed. The cable feeding element also has two axial passageways for the line wires, which are disposed in an offset manner with respect to the bores in the coil element and are fed in close proximity to the coil element.

A simple structure is obtained, wherein the coil element and the cable feeding element are substantially relieved from the support force of the locking spring, in that the coil core being mounted in the coil element is provided with at least two edge flanges protruding over the outer circumference of the coil element. Advantageously, the coil element may be formed by injection molding on the coil core, so that both parts form a unit.

The support for the locking spring may be provided with an annular collar which supports immediately on a shoulder of the jet support which absorbs the support force. A more tolerance resistant embodiment is obtained with respect to freeing the locking of the needle movement sensor from play, when the edge flanges of the coil core are held by the support element against a shoulder of the jet support which absorbs the supporting force of the locking spring.

A simple and space saving embodiment is obtained when the coil core engages a counter shoulder of the coil element with a shoulder directed against the cable feeding element and the cable feeding element is locked between the coil element and a shoulder of the jet support.

In this embodiment, permissible tolerance deviations may also be so selected that the segments of the coil element and the cable feeding element, which receive the bores for the feeding wires may, are slightly axially braced and thereby locked shake resistant.

It is particularly advantageous in all injection jets with a needle movement sensor. The anchor bolt immerses in a bore of the coil core and limits an air slot with the wall of the bore. The bore in the coil core is conically shaped at least for part of its length. The front end of the anchor bolt immerses into the conical segment of the bore and is accordingly conically tapered. In this manner, the outer diameter of the coil core and accordingly also the outer diameter of all other parts of the needle movement sensor and the jet support may be dimensioned smaller dimensioned than in an embodiment with a cylindrical bore in the coil core. Moreover, the conical shape of the air slot with respect to a voltage signal of the induction coil 30 to be evaluated is more tolerance resistant than a cylindrical shape, so that in many applications means for setting the air slot by axial displacement of the coil core is completely superfluous.

BRIEF DESCRIPTION OF THE DRAWINGS

One embodiment of the invention is illustrated in the drawing and explained in more detail in the following description.

DESCRIPTION OF THE PREFERRED EMBODIMENT

Figure 2:
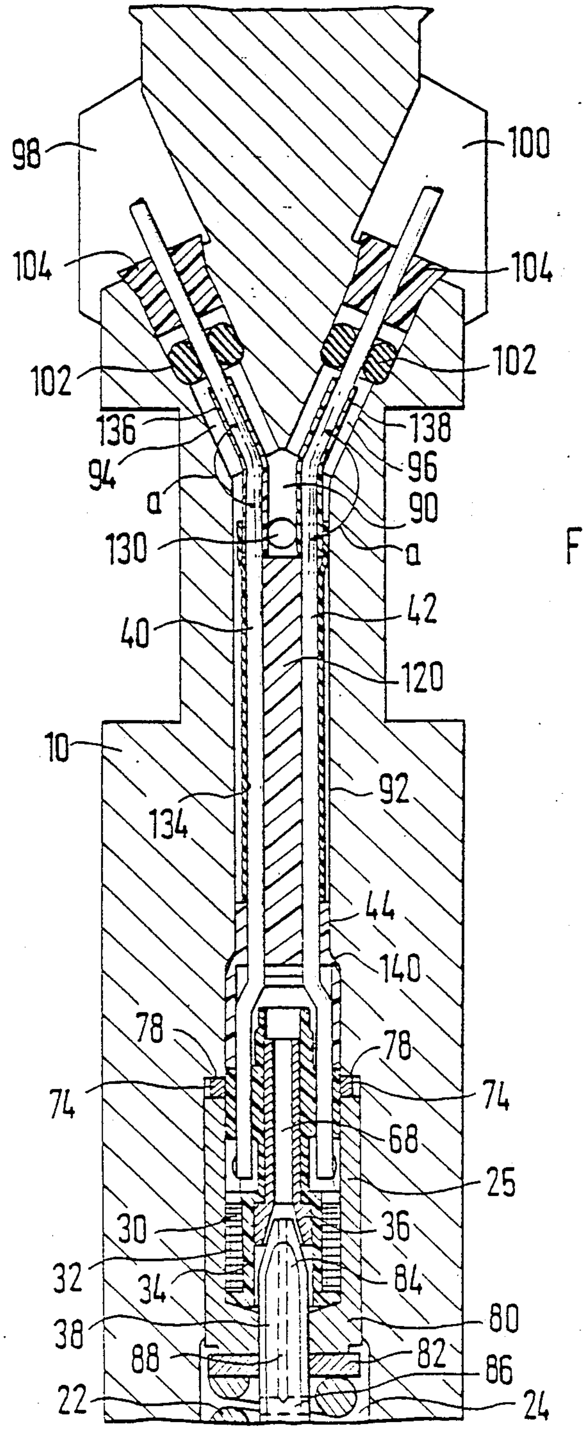
FIG. 2 is an enlarged longitudinal cross-section with respect to FIG. 1 through the needle movement sensor of the injection jet in accordance with FIG. 1.

The injection jet has a jet support 10 against which an intermediate plate 12 and a jet element 14 are braced by means of a screw cap 16. A valve needle 18 is displaceably mounted in the jet element 14 on which a locking spring 22 acts by means of a pressure piece 20, the locking spring being mounted in a spring chamber 24 (FIG. 2) of the jet support 10. The locking spring 24 supports on the jet support 10 by means of a support element 25, whose structure and double function will be explained in more detail in the following.

The valve needle 18 cooperates with an inwardly directed valve seat in the jet element 14 and performs its opening stroke against the flow direction of the fuel. As is customary, the feeding bore of the valve needle 18 is expanded at one location to a pressure chamber, in the range of which the valve needle 18 is provided with a pressure shoulder facing the valve seat and which is connected by means of conduits, not shown, in the jet element 14, in intermediary disk 12 and the jet support 10 with a fuel-connecting socket 26 of the jet support 10. The fuel pressure which engages on the pressure shoulder of the valve needle 18 pushes the valve needle 18 against the force of the locking spring in an upward direction until a nonvisible shoulder on the valve needle 18 abuts the lower front face of the intermediary disk 12 and limits the further upward stroke of valve needle 14.

A needle movement sensor (FIG. 2) is built in the jet support 10 which is connectable to an evaluation circuit of a control device for the fuel supply or a testing device. The needle movement sensor consists of an induction coil 30 with a winding 32 and coil element 34, a coil core 36, an anchor bolt 38, a magnetic return path formed by the support element 25 and two feeding cables 40,42 fed through a cable feeding element 44. The mentioned parts of the needle movement sensor are described in more detail in the following.

Figure 3:
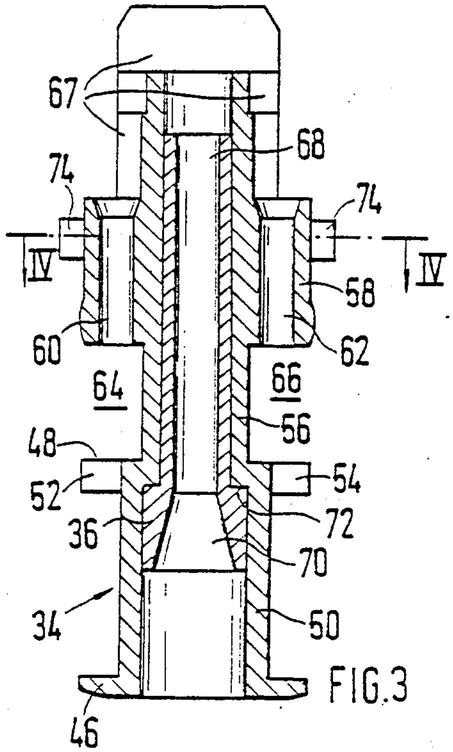
FIG. 3 is a longitudinal cross-section through the coil element together with the coil core of the injection jet in accordance with FIG. 1.

The coil element 34 (FIG. 3) is designed as a plastic injection molded part, wherein the coil core 36 is molded in. The coil element 34 is provided with two annular flanges 46,48 which limit a first cylindrical segment 50 which supports the winding 32. Two diametrically disposed slots 52,54 are provided in annular flange 48 through which the connecting ends of the winding 32 are fed through. The first cylindrical segment 50 of the coil element 34 is connected through a neck like second axial segment 56 with a third cylindrical segment 58, whose diameter corresponds to about the diameter of the annular flange 46,48 and which is provided with two bores 60,62 which correspond with slots 52,54 in annular flange 48. The feeding wires 40,42 are fed through bores 60,62 and connected with the connecting end of winding 32 by means of the free spaces 64,66 formed between the annular flange 48 and the third segment 58. The coil element 34 is provided with edge shoulders 67 at the upper front face which, as will be described in the following, are used for guiding and friction locking clamping of the feeding wires 40,42.

The coil core 36 consists of soft iron and is provided with a continuous bore 68 which on the one end which changes over into a conical segment 70. At the outer circumference the coil core 36 is provided with an annular shoulder 72 which engages on a counter shoulder of the coil element 34. Furthermore, the coil core 36 is provided with two segment like edge flanges 74 which are separated from each other by radial slots 76 and are disposed in the area of the cylindrical segment 58 of the coil element 34. During the injection molding of the coil core 34 the radial slots 76 are filled with the material of the coil element 34 and the edge flange 74 is partially covered at both sides, whereby these parts are connected to a nondetachable structural unit.

The edge flange 74 of the coil core 36 protrude radially beyond the coil element 34 and are pushed by the support element 25 against an annular shoulder 78 of the jet support 10. The support element 25 also consists of a soft iron and is provided with a bottom 80 which has a central bore in which the anchor bolt 38 is guided with clearance of motion. An annular disk 82 consisting of wear resistant material engages on bottom 80 of the support element 25, through which the support force of the locking spring 22 is transmitted to the support element 25 and further to the annular shoulder 78 of jet support 10.

Figure 1:
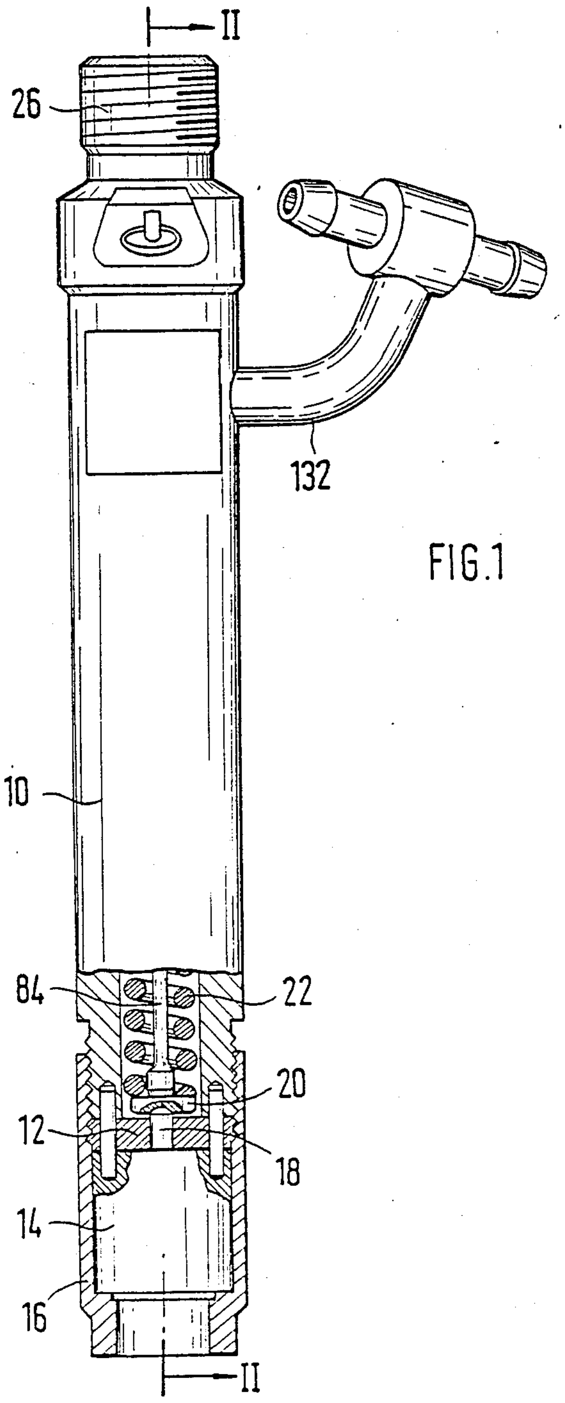
FIG. 1 shows an injection jet partially in a side view and partional in a longitudinal section.

The anchor bolt 38 consists of magnetic conductive material and is connected by means of a rod part 84 (FIG. 1) with pressure piece 20 which consists of wear resistant material, or at least is provided with wear resistant fittings on the engagement faces of the locking spring 22 and the valve needle 18. The upper end 84 of anchor bolt 38 immerses into the conical segment 70 of bore 68 in coil core 36 and is conically shaped. An air slot is formed in the magnetic circle of induction coil 30 between the end 84 of anchor bolt 38 and the wall of the conical segment 70 of bore 68, whose size changes with the stroke of the valve needle 18. A transverse bore 86 is provided in the anchor bolt 38 within the area of the spring chamber 24 from which a longitudinal bore 88 extends to the front face of anchor bolt 38.

The feeding wires 40,42 are fed through a cable conduit 90 in the jet support 10 which consists of a central conduit segment 92 extending coaxially with respect to the induction coil 30 and two outer conduit segments 94,96 which are designed as tight bores. They are diametrically disposed with respect to each other and enclose a truncated angel a together with the central conduit segment 92. At the outer end the conduit segments 94,96 discharge in the area of recesses 98,100 in the jacket of jet support 10. Each conduit segment 94,96 is tightly closed to the outside by an O-ring 102 and a plastic plug 104. The feeding wires 42,44 are connected in a suitable manner with further lines in the area of recesses 98,100.

Figure 5:
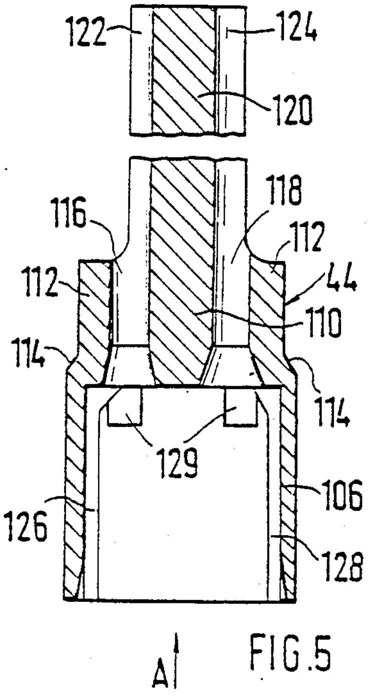
Figure 4:
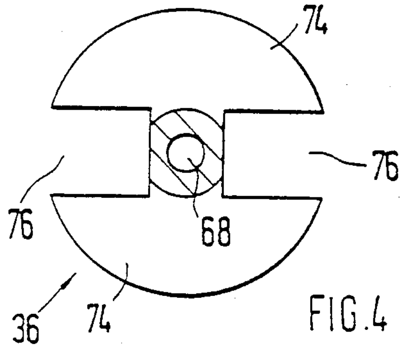
FIG. 4 is a cross-section only through the coil core along line IV—IV in FIG. 3, FIG. 5 a is longitudinal cross-section through the cable feeding element of the injection nozzle in accordance with FIG. 1, and FIG. 6 a is view of the cable feeding element in direction of arrow A in FIG. 5.
Figure 6:
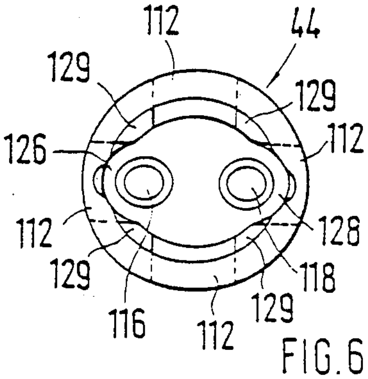

The cable feeding element 44 (FIGS. 5 and 6) is inserted into the central conduit segment 92 which has a cylindrical segment 106 and subsequently thereto a segment 110 extends which in its cross section is cross shaped. This segment is provided on the jacket circumference, corresponding to is cross-sectional shape, with 4 bars 112 which are offset with respect to each other by 90° which change over into the cylindrical segment 106 at one each shoulder 114. Axial bores 116,118 for the passage of feeding wires 40,42 are provided in two opposite bars 112, whose parallel distance is smaller than that of bores 60,62 in coil element 34.

A cylindrical segment 120 is attached to segment 110 of conduit feeding element 44, whose diameter corresponds to about the parallel distance of bores 116,118. These continue in the segment 120 in form of grooves 122,124 having about a semicircular shaped cross section which are also used for the cable feeding. The length of segment 120 is such that the cable feeding element 44 fills the largest part of the central conduit segment 92. Two diametrially opposed wall grooves 126,128 for feeding the feeding wires 40,42 are formed inside of segment 106 of the cable feeding element 44.

The central conduit segment 92 of the cable conduit 90 forms an oil leaking conduit together with bores 86,88 in the anchor bolt 38, the bore 68 in coil core 36 and apertures 129 in cable feeding element 44, which extends from the spring chamber 24 into bore 130 of a oil leaking connecting socket 132 mounted on jet support 10.

The installation of the needle movement sensor in the jet support 10 is performed in that at first the bare feeding wires 40,42 are moved through bores 60,62 in coil element 34 and are connected with the connecting ends of winding 32. Thereafter, the cable feeding element 44 is mounted onto the feeding wires 40,42 and pushed forward until it engages on coil element 34. Thereby, the feeding wires 40,42 are severely bent in the transition area between the parts, whereby an automatic traction relief is obtained for the connections with the connecting ends of winding 32. This effect is supported by the shoulders 67 which are tipstretched on coil element 34. If need be, the cable feeding conduit 44 may be provided with corresponding shoulders in the area of its cylindrical segment 106, which are in conformity with the coil element in such a manner that the feeding wires in this area are subjected to a slight squeezing in this area after the assembly of the injection jet.

After the placing of the cable feeding element 44 a shrink hose 134 is mounted over the cylindrical segment 120 and the segments of the feeding wires 40,42 which are disposed in the grooves 122,124, whereby instead of the shrink hose a correspondingly shaped plastic element may be used. Thereafter, insulating sheaths 136,138 are placed on the end segments of feeding wires 40,42 which extend from the cable feeding element 44 or the shrink hose 134, which are so dimensioned that they extend to the proximity of the O-rings 102 after the installation.

The structural group which had been prepared in this manner can be placed into the jet support 10 until the edge flanges 74 of the coil core 36 come into engagement with the shoulder 78 and shoulders 114 on cable feeding element 44 on an annular shoulder 140 of the jet support 10. When inserting the structural group in the jet support 10 the two end segments of the feeding wires 40,42 thread without any noticable inhibition into the two outer conduit segments 94,96 of the cable conduit 90, whereby the assembly is further facilitated. When installing the intermediary plate 12 and the jet element 14 the anchor bolt 38 extends through the bore in support element 25 and approaches the coil core 36 up to the desired air slot. The locking spring 22 supports on shoulder 78 of the jet support 10 by means of the support element 25 and the edge flanges 74 of coil core 36 and thereby simultaneously locks the parts of the needle movement sensor without any clearance.

The conical shape of the front face 84 of anchor bolt 38 and the bore segment 70 in coil core 36 keeps the diameter of the needle movement sensor small to yield a relatively tolerance resistant embodiment with respect to the air slot dimensioning, so that in many cases special means for setting of the air slot are not required.

I claim:

1. A fuel-injection jet support of an internal combustion engine that uses a jet element for injecting a fuel into the internal combustion engine, the fuel to be injected having a flow direction with a pressure during injecting, the jet element being formed to receive the fuel to be injected therein and including a valve needle displaceably guidable and movable in the jet element, and locking spring means for biasing the valve needle in a biasing direction, the valve needle being arranged to be pushable in a direction opposite that of the biasing direction toward the locking spring means by the fuel pressure when the fuel pressure is received in the jet element, the valve needle having an opening stroke during which the valve needle is movable in a direction opposite the flow direction of the fuel to be injected, the jet support comprising:

a jet support housing (10) to which the jet element (14) is fixably holdable, said jet support housing having an outer circumference and having means for accomodating the locking spring means and including a chamber formed therein;

a cable feeding element (44), said jet support housing being formed with means accomodating said cable feeding element therein;

means for sensing movement of the needle and including a coil element (34), an induction coil (30) with a connection end, and feeding means including at least one feeding line (40, 42) extendable between said outer circumference of said jet support housing (10) and said connection end of said induction coil (30), said jet support housing (10) being formed with means accomodating said sensing movement means therein, said coil element (34) being engaged with said cable feeding element (44);

means for guiding said feeding line (40, 42) between said outer circumference of said jet support housing (10) and said connection end of said induction coil (30) and including said jet support housing (10), said cable feeding element (44), and said coil element (34) communicating with each other and thereby forming a common cable conduit (90), said feeding line extending through said common cable conduit (90), said common cable conduit (90) having a central conduit portion (92) in said jet support housing (10) coaxially disposed with respect to said induction coil (30); and traction relief means for releiving traction when feeding said line through said common conduit (90) and including said cable feeding element (44) cooperating with said coil element (34) so that each defines a passageway in communication with each other constituting a portion of said common cable conduit, said traction relief means further including a recess (64, 66) formed on an outer periphery of said coil element between the passageway (60, 62) and the connection end of the induction coil (30) so that an electrical contact between said feeding line (40, 42) and said end of said induction coil (30) is accessible radially outside said coil element (34).

2. A support as defined in claim 1, wherein said jet support housing is susceptable to an oil leakage, further comprising:

means for discharging an oil leakage through said jet support housing and including said central conduit portion (92).

3. A support as defined in claim 1, wherein a first of said passageways being formed in said coil element and a second of said passageways being formed in said cable feeding element, said first and second passageways being offset with respect to each other and yet arranged so that said feeding means force deflects when fed therethrough so as to relieve said traction.

4. A support as defined in claim 3, wherein said relieving traction means includes another of said passageways offset from each other, each of said another passageways being formed in each of said coil element and said cable feeding element, said feeding means including another feeding line extending through said another passageways.

5. A support as defined in claim 1, wherein said coil element (34) has an outer circumference, said sensing means including a coil core (36) mounted in said coil element (34) and having at least one edge flange (74)

protruding beyond said outer circumference of said coil element; and further comprising:

means for simultaneously supporting said locking spring means and forming a magnetic return path for said sensing means and including a support element (25) engaged with said edge flange (74).

6. A support as defined in claim 5, wherein said locking spring means exerts a support force in a direction opposite to said biasing direction, said jet support housing having an inner shoulder portion (78) therein, said edge flange (74) being held by said support element (25) against said shoulder (78), said support element being arranged between said shoulder (78) and said locking spring means (22) so that said shoulder receives a support force exerted by said locking spring means (22).

7. A support as defined in claim 1, wherein said jet support housing (10) is formed with an inner shoulder (140) communicating with said accomodating means for said cable feeding element (44), said cable feeding element (44) being locked into position between said coil element (34) and said shoulder (140).

8. A support as defined in claim 1, further comprising:

an anchor bolt movable in association with the valve needle, said sensing means including a coil core mounted in said coil element; and means for accomodating a movement of said anchoring bolt and including said coil core having a wall defining a cavity, said anchor bolt having a face movable into said cavity, said cavity having at least a portion formed so as to have a conical shape, said face being conically tapered to conform in shape with said conically shaped portion of said cavity.

9. A support as defined in claim 1, wherein said cable feeding element, sensing means and said feeding means are preformed into one single structural unit and insertable into said jet support housing.

10. A support as defined in claim 1, wherein each of said discharge outer conduit portions are offset from each other by 180°.

11. A support as defined in claim 10, wherein said discharging means includes another discharge outer conduit portion, each of said discharge outer conduit portions being offset from each other by at least 90°, said feeding means including another feeding line which extends through said another discharge outer conduit portion.

12. A support as defined in claim 1, wherein said traction relief means includes means for discharging said feeding line to said outer circumference of said jet support housing (10) at a truncated angle (a) relative to said central conduit portion (92), said discharging means including at least one discharge outer conduit portion (94, 96) extending from said central conduit portion (92) to said circumference of said jet support housing (10), said feeding line extending through said discharge outer conduit portion from said central conduit portion (92).

* * * * *